April 26, 1938.  E. U. CAVE  2,115,620
APPARATUS FOR WEIGHING CYLINDRICAL BODIES
Filed Nov. 25, 1935  7 Sheets-Sheet 1
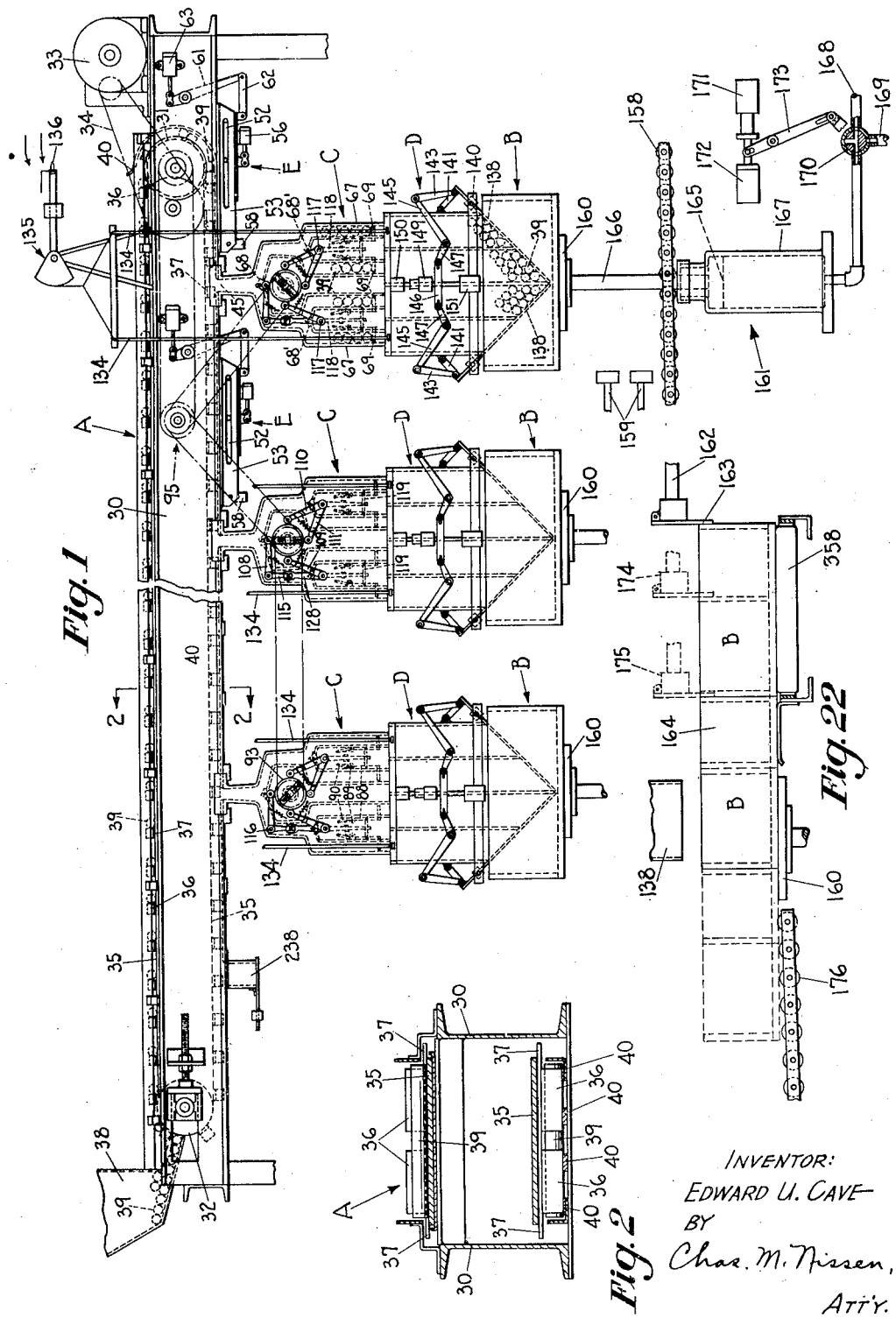
INVENTOR:
EDWARD U. CAVE
BY Chas. M. Nissen,
Att'y.

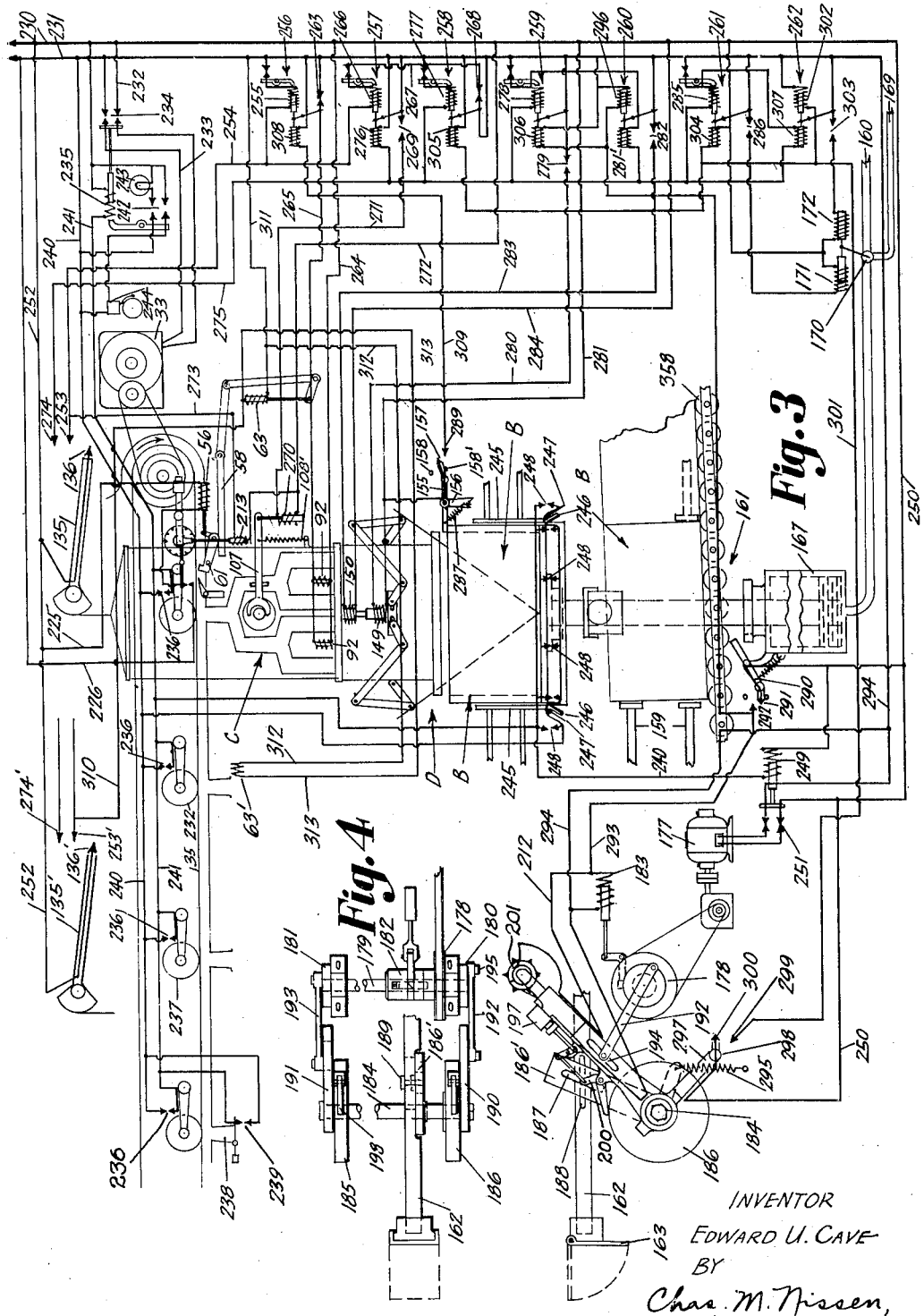

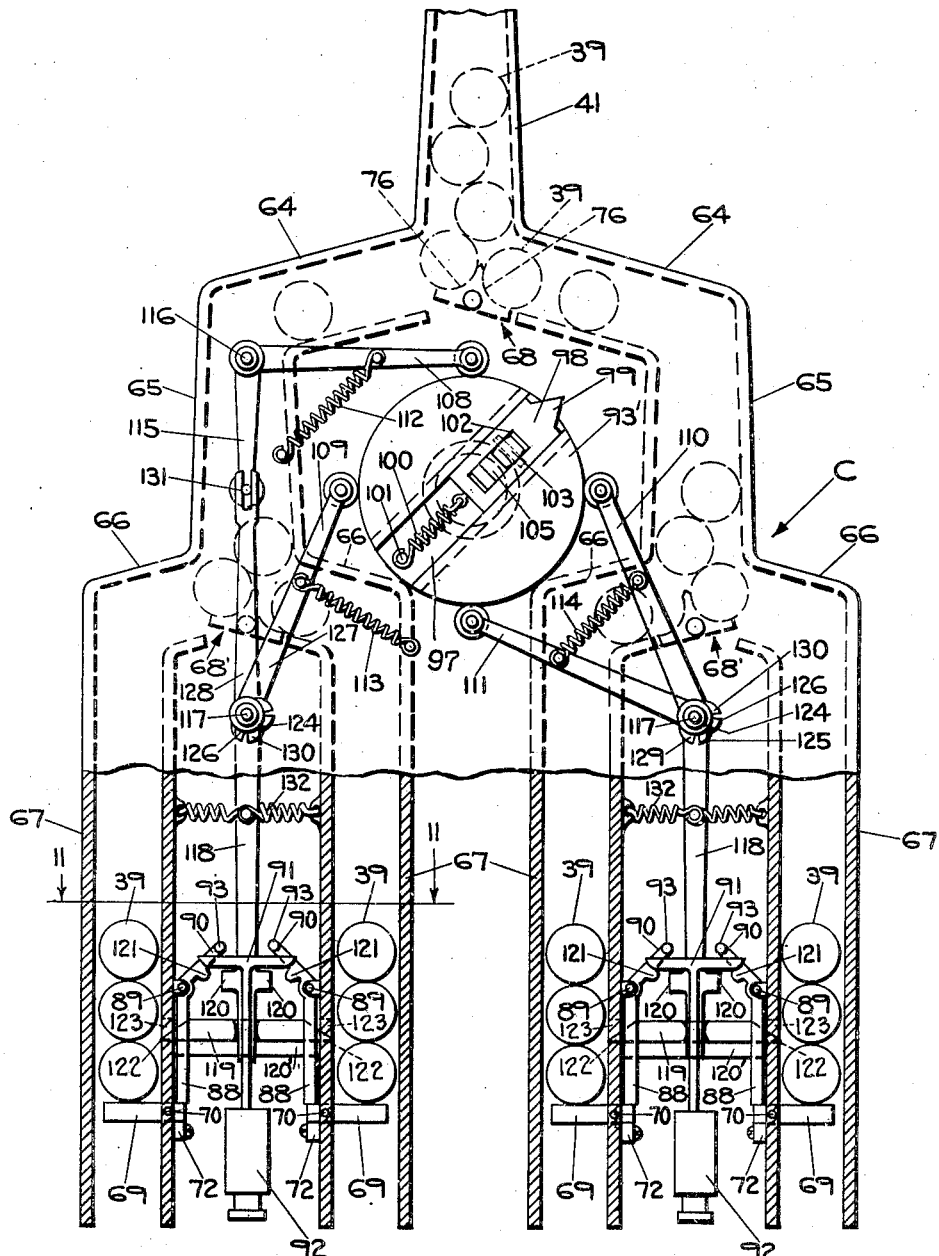

April 26, 1938.  E. U. CAVE  2,115,620
APPARATUS FOR WEIGHING CYLINDRICAL BODIES
Filed Nov. 25, 1935   7 Sheets-Sheet 4
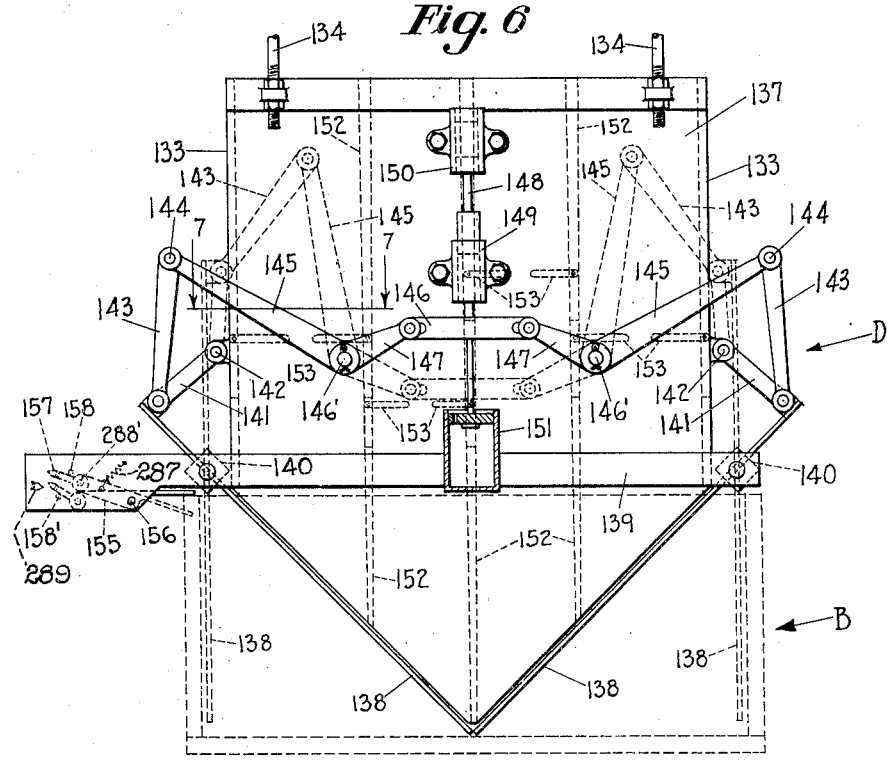
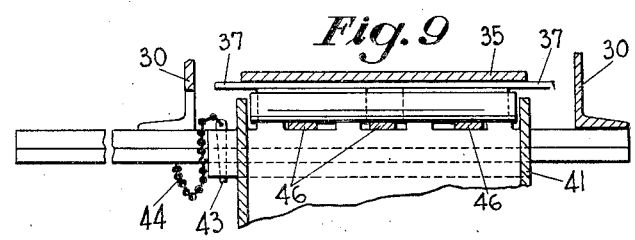
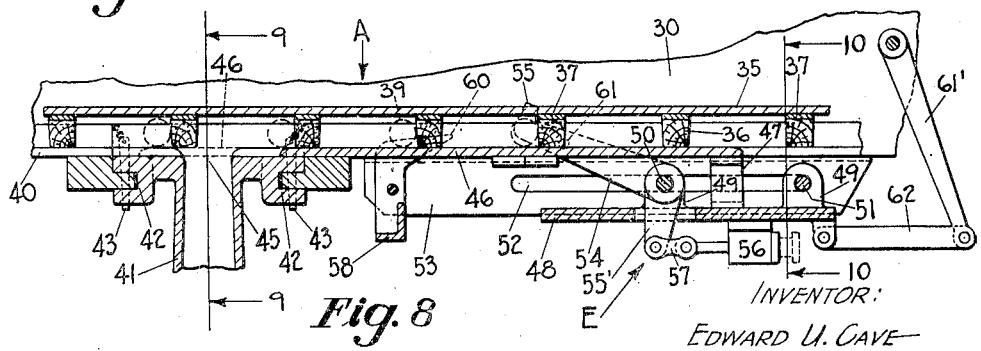
INVENTOR:
EDWARD U. CAVE
BY Chas. M. Nissen,
ATTY.

April 26, 1938.  E. U. CAVE  2,115,620
APPARATUS FOR WEIGHING CYLINDRICAL BODIES
Filed Nov. 25, 1935  7 Sheets-Sheet 5
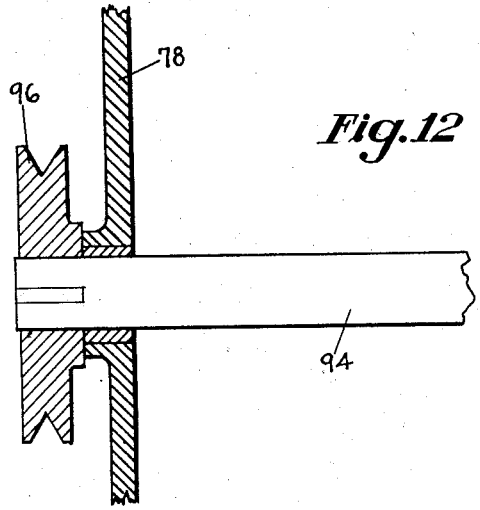
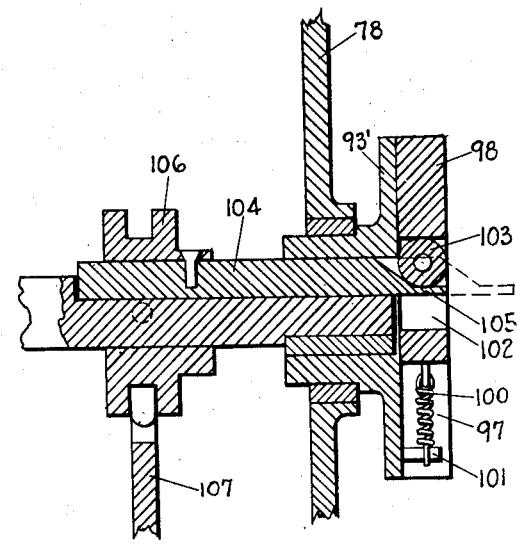
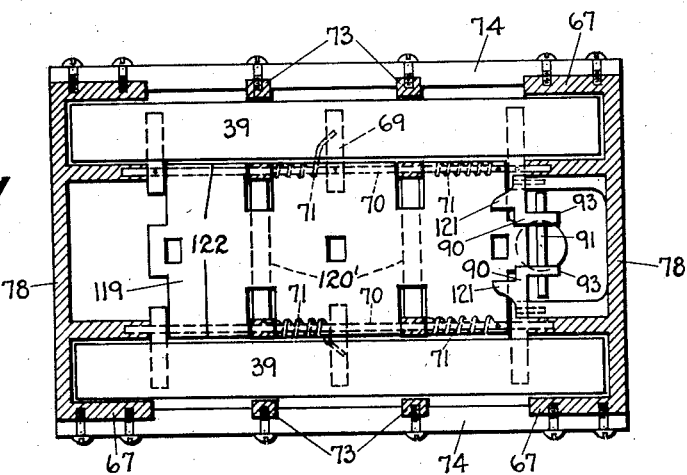
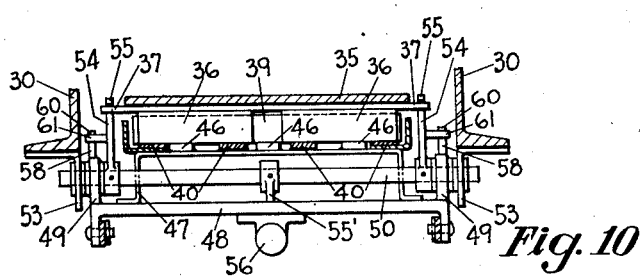
INVENTOR:
EDWARD U. CAVE
BY
Chas. M. Nissen,
ATT'Y.

April 26, 1938.   E. U. CAVE   2,115,620
APPARATUS FOR WEIGHING CYLINDRICAL BODIES
Filed Nov. 25, 1935   7 Sheets-Sheet 6
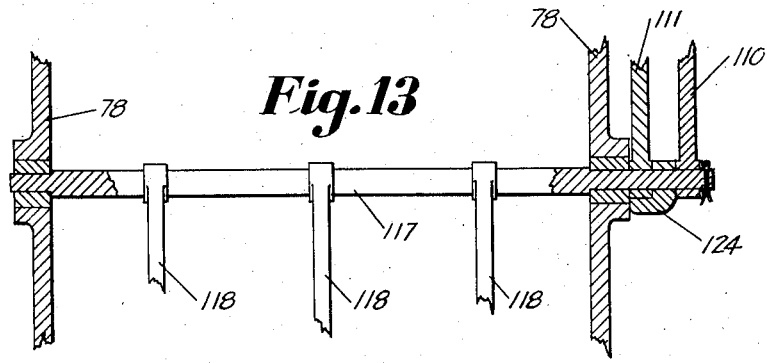
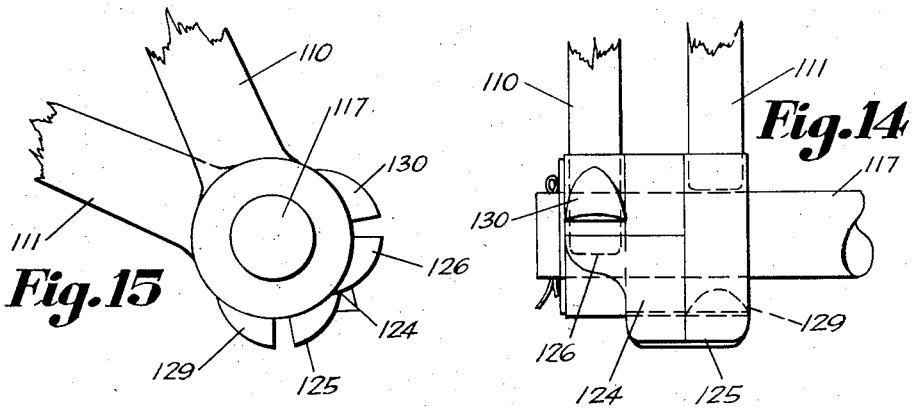
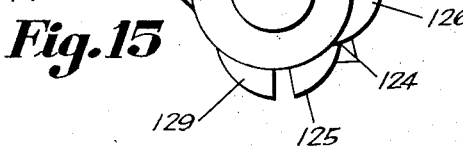
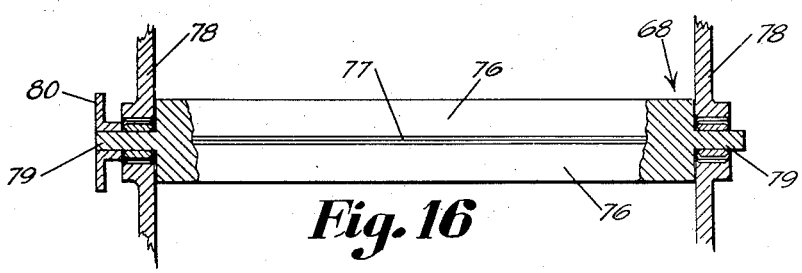
INVENTOR:
EDWARD U. CAVE
BY Chas. M. Nissen,
ATTY.

April 26, 1938. E. U. CAVE 2,115,620
APPARATUS FOR WEIGHING CYLINDRICAL BODIES
Filed Nov. 25, 1935 7 Sheets-Sheet 7
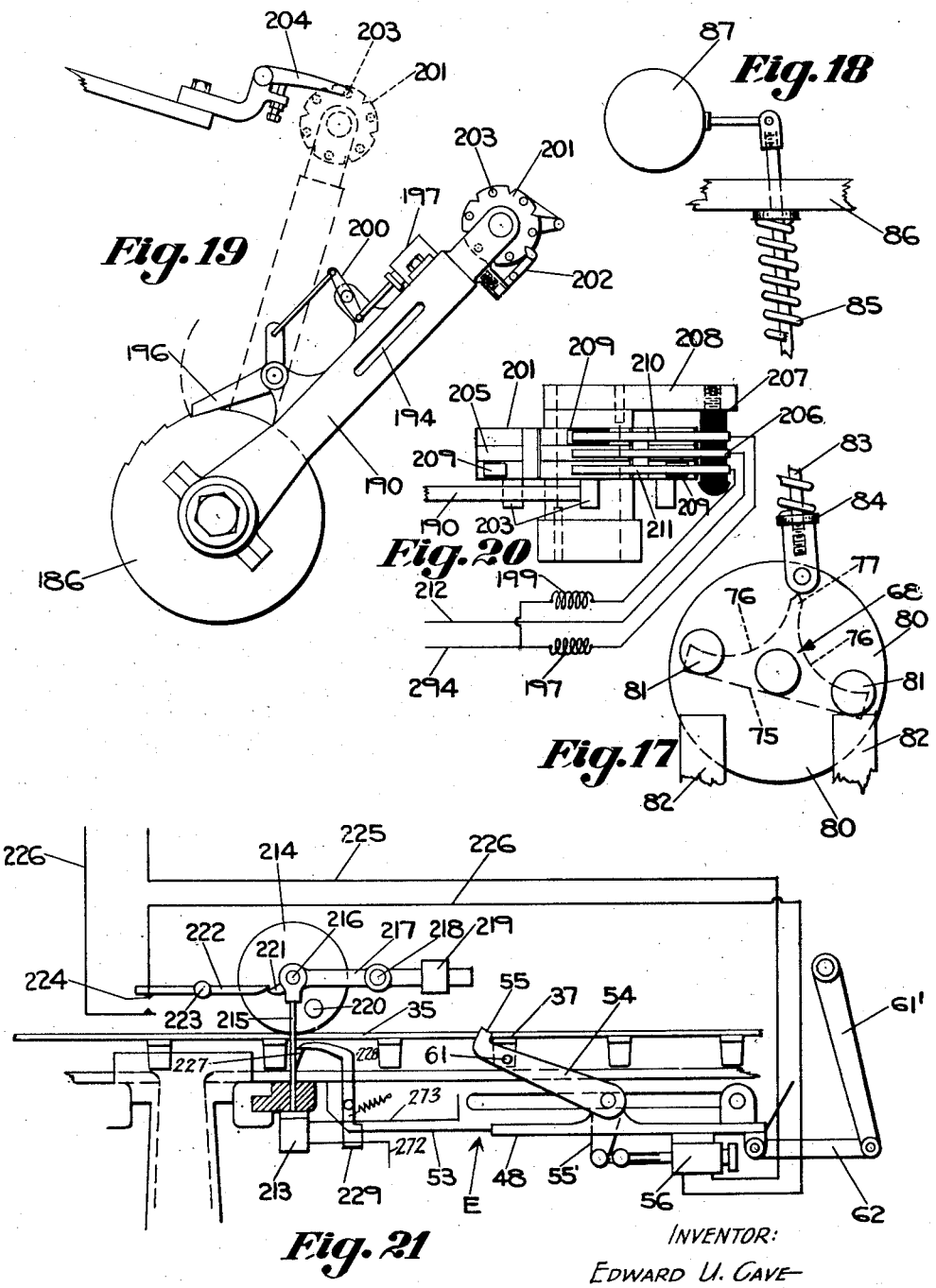
INVENTOR:
EDWARD U. CAVE
BY Chas. M. Nissen,
ATTY.

Patented Apr. 26, 1938

2,115,620

UNITED STATES PATENT OFFICE 2,115,620

APPARATUS FOR WEIGHING CYLINDRICAL BODIES

Edward U. Cave, Lancaster, Ohio, assignor to The Jeffrey Manufacturing Company, a corporation of Ohio Application November 25, 1935, Serial No. 51,529

6 Claims. (Cl. 249—3)

This invention relates to a packaging or container filling apparatus, and is particularly adapted to stack cylindrical bodies, such as dynamite sticks, or any other cylindrical bodies, in containers, such as boxes, in cord-wood fashion and of uniform depth over the entire area of the container, and to place a given weight of material in each container.

An object of the invention is, therefore, to provide an automatic apparatus for filling boxes with cylindrical bodies, with the bodies stacked in cord-wood fashion, with a predetermined weight of material in each box.

Another object of the invention is to provide an improved distributor and diverter for distributing cylindrical bodies uniformly to channels which branch from a main receiving channel.

Still another object of the invention is to provide a distributor which forms a cascade path for a cylindrical body whereby the continuous vertical drop of a body is restricted. This is particularly useful where dynamite bodies are being boxed as the maximum allowable vertical drop is restricted.

A further object of the invention is to provide an improved discharge mechanism for a weighing hopper.

Another object of the invention is to provide a pay-off device, which will operate to drop cylindrical bodies at a fixed time interval, after a predetermined weight of such bodies has been received by a weighing hopper.

Still another object of the invention is to provide an improved gate control mechanism.

Another object of the invention is to provide a complete electrical control system for an automatic weighing, distributing, and boxing apparatus.

Other objects of the invention will appear hereinafter, the novel features and combinations being set forth in the appended claims.

In the accompanying drawings,

Fig. 1 is a side elevational view of part of the apparatus comprising my invention, the control circuits and certain operating parts being omitted for clearness;

Fig. 2 is a sectional view of the conveyor of my invention taken on the line 2—2 of Fig. 1 looking in the direction of the arrows;

Fig. 3 is a wiring diagram of a portion of the control system, including certain mechanical features, shown diagrammatically;

Fig. 4 is a plan view of the ram and operating mechanism therefor shown diagrammatically in Fig. 3;

Fig. 5 is a combined side elevation and sectional view of one of the distributors of my invention;

Fig. 6 is a side elevational view of one of the weighing hoppers of my invention;

Fig. 7 is a detailed sectional view taken on the line 7—7 of Fig. 6;

Fig. 8 is a longitudinal sectional view showing a gate closing mechanism leading to a distributor;

Fig. 9 is a sectional view taken on the line 9—9 of Fig. 8;

Fig. 10 is an end view taken on the line 10—10 of Fig. 8;

Fig. 11 is a sectional view taken on the line 11—11 of Fig. 5;

Fig. 12 is a sectional view of the cam operating mechanism for the distributor of Fig. 5;

Figs. 13, 14 and 15 are detail views of the payout of the distributor of Fig. 5; Fig. 13 being a sectional view, Fig. 14 a side view and Fig. 15 an end view;

Fig. 16 is a plan view of a diverter;

Fig. 17 is an end view of the diverter of Fig. 16, and the operating lever therefor;

Fig. 18 is an end view of the top portion of the operating lever for the diverter;

Fig. 19 is an enlarged view of the ram operating lever shown diagrammatically in Fig. 3;

Fig. 20 is an enlarged view of the control drum on the end of the lever of Fig. 19;

Fig. 21 is a side elevational view of the time delay mechanism for closing the gate, shown more in detail in Fig. 8; and Fig. 22 is a transverse view of the conveyors for the containers and the elevating and ram mechanism therefor.

Referring particularly to Fig. 1 of the drawings, there is illustrated somewhat diagrammatically a portion of the mechanical elements which comprise the apparatus of my invention; substantially all of the electrical control circuits being here omitted in the interest of clearness. The problem presented is to take cylindrical bodies, such as sticks of dynamite, from a conveyor A and to place them in a container such as a box B, of which there are three illustrated in Fig. 1, though the number may be increased or reduced as desired, so that the cylindrical bodies are evenly distributed over the whole area of the box and are stacked in cord-wood fashion. It is further desirable to place a given weight of material comprising the cylindrical bodies in each of the boxes B. Briefly described, this is effected in the following manner, the detailed means being more completely described hereinafter.

The conveyor A comprises a frame 30 with a head pulley 31 and an adjustable tail pulley 32. The head pulley 31 is driven from a motor 33 through appropriate speed reduction and drive mechanism 34. An endless belt 35 travels between the pulleys 31 and 32 and is provided with flights 36 having laterally projecting arms 37.

A hopper 38 may be provided for feeding cylindrical bodies 39, such as dynamite sticks, to the conveyor A. Adjacent its forward end, the conveyor A is provided with a plurality of spaced guide straps 40 which guide and support the bodies 39 to the bottom portion of the conveyor A. Said bodies 39 are then delivered to one of a plurality of distributors C, by which they are diverted into a plurality of chutes, hereinafter described more in detail, from which chutes they are directed into isolated compartments of a weighing hopper D. It may be pointed out that when a predetermined weight of material is received in the first of said hoppers D, that automatic means is set into operation to discharge said hopper into the box B with the bodies 39 stacked in cord-wood fashion, and equally distributed over the entire area of said box. When this takes place a gate shuts off the supply of cylindrical bodies to the first distributor C and directs them to the second distributor C. This action is repeated with the successive distributors until the last hopper D has received the necessary amount of material, after which the cycle is repeated. When a box B is filled with material it is automatically lowered from the hopper D and pushed to a conveyor which carries it away, an empty box being substituted therefor, to be filled in a similar manner.

Referring particularly to Figs. 1, 5, 8, 9, 10 and 21, attention is now directed to the particular construction of the distributors C and of the gate closing mechanism E associated with each of said distributors. It may be pointed out that the distributors and the gate closing mechanisms are all of similar structure except, however, that the last distributor C associated with the conveyor does not have any gate closing mechanism associated therewith, for reasons which will be pointed out hereinafter.

Said distributors C each comprise a main chute 41 which increases in width progressively downward. As best seen in Fig. 5 of the drawings, the chute 41 has a length slightly greater than the length of the cylindrical body 39 which is to be packaged or boxed. The distributor C may be suspended from the frame 30 of the conveyor A by means of sliding tongue and groove construction 42, best seen in Fig. 8. Removable tapered pins 43 carried at the ends of chains 44 may extend through appropriate apertures in the tongue and groove to retain the distributor C on said frame.

Associated with the mouth 45 of the distributor C is a gate mechanism E comprising a plurality of sliding straps 46 adapted to slide over the mouth 45 and close it. Rigidly attached to said straps 46 is a bracket 47 which extends downwardly to a plate 48. The plate 48 carries a pair of upstanding bosses 49, 49 at each edge thereof, each of which carries transversely extending shafts 50 and 51 which project into an elongated slot 52 carried by a pair of downwardly extending plates 53 rigid with the frame 30 of conveyor A. It will thus be seen that the plate 48 and those parts carried thereby, is slidably mounted on the frame 30 of conveyor A.

Keyed on the shaft 50 is a lever 54 having at its upper end a hook 55 (see Fig. 21) adapted to hook over and latch onto one of the arms 37 of the conveyor A. To operate the lever 54 another lever 55' is keyed to the shaft 50 and is connected to the armature of a solenoid 56 by appropriate link mechanism 57. As will be hereinafter explained in connection with the electrical control system, when the solenoid 56 is energized, the lever 54 will pivot in a clockwise direction and latch onto one of the arms 37 of the conveyor A.

As a consequence, the entire gate mechanism E comprising the straps 46, the plate 48 and all those elements carried by said plate, will be moved towards the left, as viewed in the drawings, thereby to close the mouth 45 of the distributor C. After said gate mechanism has moved to a closed position, the plate 48 will engage the lower portion of a pair of pivoted levers 58 which are carried between plates 53 attached to the frame 30 of conveyor A.

The upper portions of the levers 58 are provided with cams 60 adapted to engage outwardly extending pins 61 carried by the levers 54. It will thus be seen that the plate 48 will rock the levers 58 about their pivot points, whereupon the cams 60 will engage the pins 61 and effect a disengagement of the hooks 55 from the arms 37. The gate will therefore be moved to its closed position and will remain in said position until reset in a manner which will be described more in detail hereinafter. It may be pointed out, however, that a reset lever 61' is connected to the plate 48 by a link 62, which lever 61' is pivoted to the frame 30 of the conveyor A (see Fig. 1) and may be operated by a solenoid 63. It may be mentioned at this point that the link mechanism for connecting the solenoid 63 and the plate 48 is preferably of the form illustrated in Fig. 1, a slightly different connection being illustrated in Fig. 3 in order to avoid unnecessary complication of this figure.

The main chute 41 of the distributor C is of gradually increasing diameter, progressively downward to a branching point, at which point a pair of gradually sloping branch chutes 64, 64 branch from said main chute 41. Each of said branch chutes 64, 64 leads to a continuation thereof comprising a vertical branch chute 65, 65. The vertical branch chutes 65, 65 in turn branch into a pair of gradually sloping secondary branch chutes 66, 66, which in turn lead to secondary vertical branch chutes 67, 67. It is to be noted that the branch chutes 65, 65 are also of increasing width progressively downward, while this construction is not necessary in the vertical branch chutes 67, 67. This downward diverging of the main chute 41 and the branch chutes 65, 65 tends to form the cylindrical bodies 39 into a position where they will be naturally distributed equally among the branches. However, to insure exact distribution of the bodies 39 between each of the branches 64, 64, and subsequently between each of the branches 67, 67, I provide a diverter 68 at the point of branching between the main chute 41 and the branch chutes 64, 64 and similar diverter 68', 68' between the branch chutes 65, 65 and the secondary branch chutes 66, 66. The construction of these diverters will be described more in detail hereinafter.

It is to be particularly noted that the branching construction of the distributor C has two important functions. In the first place, this construction provides for receiving a plurality of bodies 39 from a single point and distributing them equally into four different chutes or channels. It will, of course, be obvious that the number of chutes or channels into which the bodies 39 are finally distributed may be almost indefinitely increased by the progressive branching of any chute. While four final columns are illustrated in the drawings, I contemplate divisions into even greater numbers, such as sixteen, thirty-two or sixty-four divisions thereof. In the second place, quite independent of the action of dividing the bodies 39 into equal numbers, the branching construction of the distributor C provides an effective means for restricting the continuous vertical drop of a body 39. That is, any body 39 can only drop a limited amount, as determined by the length of a vertical chute 41, 65 or 67, when its fall will be interrupted by an approximately horizontal chute such as 64 or 66. This is particularly useful where the bodies are explosive, such as dynamite sticks, or are susceptible to breakage due to a great fall.

Means are also provided in the secondary vertical branch chutes 67 to restrict the unimpeded vertical drop of a body 39 therethrough. This means is best illustrated in Figs. 5 and 11 of the drawings, and comprises a plurality of pivoted projections 69, 69 which extend into the chutes 67, 67 and are adapted to be struck by a falling body 39. The projections 69, 69 are rigidly attached to shafts 70, 70 with which cooperate coil springs 71, 71 which urge the projections 69 to their horizontal position, as illustrated in Fig. 5.

Associated with a portion of the projections 69, 69 are stops 72, 72, which prevent said projections 69, 69 from moving upwardly beyond a horizontal position. It will be evident that as a body 39 drops against a projection 69, that said projection will break the free fall thereof, thereby reducing its velocity, but will pivot about its shaft 70 to allow the body 39 to continue its downward travel. It may be mentioned that the coil springs 71 are of such strength that the weight of a single body 39 resting on them is sufficient to move them to a position to permit the body 39 to pass downwardly through the branch chute 67. It may also be mentioned, as is clearly shown in Fig. 11, that the side walls of the chutes 67, 67 may be of open or latticed construction as provided by vertical extending members 73, 73 and cross members 74, 74.

The construction of the diverters 68 and 68' is best seen from Figs. 5, 16, 17 and 18 of the drawings. Said diverter 68 is formed with a bottom portion 75 and a pair of arcuate surfaces 76, 76 which terminate in a point 77. Said diverter is carried between the end plates 78, 78 (Fig. 16) of the distributor C by stub shafts 79, 79. Upon one of the stub shafts 79, 79 is a disc 80 carrying a pair of spaced pins 81, 81. Said pins 81, 81 cooperate with adjustable stops 82, 82 to restrict the oscillatory movement of the diverter 68 under the influence of the bodies 39. A lever 83 is pivoted to the disc 80 and is provided with a washer 84 against which presses a coil spring 85, the other end of which presses against a plate 86 rigid with an end plate 78 of the distributor C. Counting mechanism 87 is connected to the upper end of the lever 83 which thereby will count the number of bodies 39 which are fed to the distributor C in any given time.

The diverters 68', 68' are identical in construction to the diverter 68 except, however, that there is no counter 87 associated therewith. In the operation of the diverter 68 let it be assumed, that said diverter is in the position illustrated in Fig. 5. In this position the right hand body 39 is free to roll down the branch chute 64 and it will do so. This will relieve the pressure on the right hand side arcuate surface 76 and the weight of the body 39 on the left hand surface 76 will pivot the diverter about its axis, thereby discharging a body 39 to the left hand branch 64. The next action of the diverter will discharge a body 39 to the right hand branch 64. This action will be repeated and provide an equal division of the bodies 39 between the branches 64. A similar action will be repeated by the diverters 68', 68' with a consequent equal distribution of the bodies 39 between the two secondary branch chutes 66, 66. It may additionally be mentioned that this division of the bodies 39 of course proportionately reduces the rate at which they will be fed into the secondary vertical branch chutes 67, 67.

In the operation of the device, as will be hereinafter described in more detail, the bodies 39 are permitted to fall through the chutes 67, 67 at random until a predetermined weight of material is present in the hopper D. For example, assuming that it is desired to place 25 pounds of material in the box B, then the bodies 39 will be permitted to fall at random into the hopper D until 24 pounds have been received by said hopper D, after which the bodies 39 will be fed to said hopper D one at a time until 25 pounds are received. This operation is termed the final pay-off and is employed to insure an accurate amount of material being received by the box or container B. This pay-off mechanism is illustrated particularly in Figs. 5, 11 and 12 of the drawings.

As was previously mentioned, the projections 69 are normally free to pivot about their shafts 70. This is due to the fact that there are associated with said projections 69 locking levers 88, 88, pivoted about pins 89, 89 and having operating arms 90, 90, which operating arms are normally contacted by operating plates 91, 91 controlled by solenoids 92, 92, which, when energized, are effective to lift the plates 91, 91 against projections 93, 93 on the arms 90, 90 (see Fig. 11) to oscillate the levers 88, 88 so that they do not hold the projections 69, 69 in fixed position. Upon the de-energization of the solenoids 92, 92, the locking levers 88, 88 will lock the projections 69, 69 to prevent the passage of any body 39 therebeyond. It is thus evident that the projections 69, 69 perform a double function in that when free to oscillate they break the fall of a body 39 and they also cooperate to provide for the final pay-off of said bodies 39.

As a part of the pay-off mechanism of each distributor C there is a disc 93' rotatably mounted upon the shaft 94 driven from the motor 33 (see Fig. 1) through appropriate belt and pulley driving mechanism 95 including the pulley 96. The disc 93' is provided with a radial slot 97 within which is a plate 98 provided with a cam 99. A spring 100 is attached at one end to the plate 98 and at the other end to a pin 101 carried by the disc 93'. As a consequence, the plate 98 is urged to a position in which the cam 99 is within the circumference of the disc 93'. The plate 98 is provided with an aperture 102 within which is a roller 103. Slidably mounted upon the shaft 94 is a rod 104 having a cam 105 at the outer end thereof. Connected to the rod 104 is a shifting collar 106 with which cooperates the bifurcated end of an operating lever 107. It will be evident that by pivoting the lever 107 in the manner illustrated in Fig. 3, the rod 104 may be shifted whereby the cam 105 cooperates with a roller 103 to project the cam 99 on plate 98 beyond the extremities of the disc 93'. The lever 107 is biased by a spring 108' (Fig. 3) to move the cam 99 to its non-operating position as illustrated in Fig. 12. The operating position of the cam is illustrated in Fig. 5.

Assuming that a sufficient number of bodies 39 have been fed at random into the weighing hopper D to provide 24 pounds of material therein, the solenoids 92 will be de-energized as will be hereinafter described in more detail. Projections 69, 69 will therefore be locked in position to prevent any more bodies 39 from passing through chutes 67, 67. Mechanism is then provided which will operate lever 107 to cause the projection of cam 99. Due to the rotation of disc 93' cam 99 will successively contact rollers carried by levers 108, 109, 110 and 111. Levers 108 to 111, inclusive, are provided with coil springs 112, 113, 114 which maintain the rollers thereof in contact with the surface of disc 93'. The lever 108 is in the form of a bell crank and is provided with an arm 115, said lever being pivoted about a pin 116 carried by one end plate 78 of the distributor C.

Extending transversely between the end plates 78 of the distributor C are a pair of shafts 117, 117 (see Fig. 13). Said shafts 117 carry a plurality of downwardly extending levers 118 which extend through spaced apertures in plates 119 (see Figs. 5 and 11), which plates 119 are slidably supported upon stationary straps 120'. The lower end of the lever 118 associated with each pair of branch chutes 67 is provided with a pair of opposed hammers 120, 120 (Fig. 5) adapted to contact lugs 121, 121 (Figs. 5 and 11) carried by the arms 90, 90. It will thus be seen that upon the rocking of the shaft 117 the levers 118 will slide the plates 119 so that the projecting points 122, 122 of said plates 119, 119 will extend first into one of the branch chutes 67 and then into the other. At the same time, one of the hammers 120 will engage one of the lugs 121 to oscillate a locking lever 88, thereby to free a projection 69. Assuming, for example, that the lefthand shaft 117 of Fig. 5 is rotated in a clockwise direction, plate 119 will be moved through an opening 123 and will wedge between the two bottom-most bodies 39. At the same time locking lever 88 will oscillate and free the projection 69 in said chute. As a consequence, the bottom body 39 will be free to fall into the hopper D and all bodies 39 above the bottom body will be retained in said chute. Thus a single body 39 will be added to the hopper. As the shaft 117 returns to its normal position, as illustrated in Fig. 5, the projection 69, which was released, will again be locked, after which the plate 119 will be withdrawn and the bodies 39 will fall into the position illustrated in Fig. 5. Should the shaft 117 be rotated still further to move the lever 118 to the right, a similar action will take place in the associated chute 67 thereby to drop another, and the bottom-most body 39. It will be evident that a similar action may be effected in each of the chutes 67. The mechanism for effecting this individual pay-off in response to the rotation of the disc 93' and the operation of the levers 108 and 111, inclusive, by cam 99 will now be described.

As best seen in Figs. 5, 13, 14 and 15, there is keyed to each of the shafts 117 a collar 124 provided with a pair of stop lugs 125 and 126. The collar 124 will, of course, rotate with the shaft 117. Loosely journaled on the right hand shaft 117 of Fig. 5 are the levers 110 and 111 previously mentioned. The lever 111 carries a lug 129 adapted to contact the lug 125 upon a predetermined amount of counter-clockwise oscillation of lever 111, and the lever 110 carries a lug 130 adapted to contact the lug 126 upon a predetermined amount of clockwise oscillation of said lever 110. The lugs 125 and 126 will be spaced from the lugs 129 and 130, as illustrated in Figs. 5 and 15, when the levers 118, 110 and 111 are in the position illustrated in Fig. 5. As the disc 93' rotates in a clockwise direction, the cam 99 will oscillate the lever 110, which, in turn will oscillate the levers 118 to shift the plate 119 to the left, as viewed in Fig. 5, due to the engagement between lugs 130 and 126. At the same time a hammer 120 will engage a lug 121 to release a projection 69, as was previously described. Further rotary movement of the disc 93' will oscillate the lever 111, thereby to oscillate the levers 118 to move the plate 119 to the right, as viewed in Fig. 5, due to the engagement between the lugs 125 and 129. It is to be noted that spring centering means 132, 132 are provided which bias the levers 118 to their central positions. Similar oscillation of the left hand levers 118 is provided by levers 127 and 128 which are also provided with lugs 129 and 130. A collar 124 is also here provided of the same construction as that previously described. It may be noted that lever 128 is operated from arm 115 through a pin and slot connection 131.

Attention is now directed particularly to Figs. 1, 6 and 7, and to the construction of the weighing hopper D. Said hopper D comprises a box-like frame with side walls 133 and end walls 137 suspended from a plurality of upwardly extending hanger rods 134, of which there are four, two of which pass on each side of the conveyor A, and which are attached at their tops to a scale 135 having at its end an electrical contact point 136. The weighing hopper D, will, of course, not be connected to the distributor C, but is entirely free to move vertically with respect thereto. It is, however, positioned with respect to a distributor C to receive the cylindrical bodies 39 which are discharged by said distributor. The end walls 137 have a V-shaped bottom structure which extends to a pair of bottom plates 138, 138, which form the bottom of hopper D. Extending along each of the end walls 137 is a plate 139. Between the plates 139 and at each side of the hopper D there extends a pivoted block 140 provided with an elongated slot through which extends a bottom plate 138. The top portion of each bottom plate 138 is pivotally attached to a lever 141 which, in turn, is pivotally attached at 142 to a side wall 133. Another lever 143 is also pivotally attached to the top of each bottom plate 138, which lever is in turn pivoted at 144 to a bell crank lever 145, pivoted at 146' to an end wall 137. A strap 146 provided with elongated slots at its end, extends between and connects the short arms 147, 147 of bell crank levers 145, 145. Connected to the strap 146 is a shaft 148 provided with a pair of armatures with which are associated a pair of solenoids 149 and 150. A dash pot 151 is also associated with the shaft 148. Upon the energization of the solenoid 151 the shaft 148 will be moved upwardly and through the link mechanisms above described, the bottom plates 138 will be moved to and held in the full line position illustrated in Fig. 6, with the bottom of the hopper D closed. Upon the energization of the solenoid 149 the bottom plates 138, 138 will be moved to the dotted line position illustrated in Fig. 6. thereby completely opening the bottom of said weighing hopper. During this action the bottom plates 138 will slide through the elongated slots in the blocks 140, 140 while said blocks pivot about their axes. As a consequence, any material in the hopper D will be dumped into the box or container B.

It is also to be noted that the hopper D is provided with a plurality of partitions 152, 152 which preferably progressively decrease in thickness from their top downward and which terminate adjacent the bottom plates 138, 138. As illustrated, there are three such partitions 152, 152 which divide the hopper into four compartments, which are adapted to be fed the bodies 39 from individual secondary vertical branch chutes 67. Thus the hopper D is divided into four cells in the illustration given, to correspond with the four secondary branch chutes 67, 67. In the event that more than four branch chutes 67, 67 are employed, then the number of cells in the weighing hopper D may be correspondingly increased. In each of said cells of the hopper D and mounted upon the side walls 133 and the partitions 152, are projections 153, 153 (see Fig. 7) which are spring biased on shafts 154, 154 to break the vertical drop of any body 39 dropped into said hopper. Said projections 153 will have cooperating stops carried by the walls 133 and partitions 152 to prevent their movement above the horizontal position.

Carried at one end of one of the plates 139 I provide a switch 155 which is pivoted at 156 and carries a pivoted contact point 157 which moves between stops 158, 158'. The operation of this switch from a box B will be described more in detail hereinafter.

Referring particularly to Figs. 1, 3, 19, 20 and 22, attention is directed to mechanism for placing a box or container B in position to be filled and automatically removing it and delivering it to a conveyor after it has been filled. A small branch conveyor 358 of the gravity feed type may be provided for each of the distributors C, which branch conveyors lead from a main conveyor. Any well known means may be employed to direct containers or boxes B from said main conveyor to the individual branch conveyors.

A box, in rolling down the branch conveyor 358, will be stopped in a proper position by stop abutments 159. Said box B may then be moved laterally (see Fig. 22) from the conveyor 358 to a platform 160 carried on a hydraulic elevator mechanism 161 by a ram 162 having a pivoted abutment 163 which will allow the ram to move backwards over a box, but in moving forward will carry the box with it. Assuming that a box B is mounted on the platform 160, as is the central box B of Fig. 22, designated 164, said box 164 may be elevated into a position to receive material from the hopper D, for example, as illustrated in Fig. 1 by the operation of the elevator 161. In addition to said platform 160, the elevator 161 comprises a piston 165 attached to a rod 166, which piston works in a cylinder 167. A hydraulic pressure conduit 168 and a discharge conduit 169 are alternately controlled by a valve 170 operable from solenoids 171 and 172 through lever 173 to apply pressure to said cylinder 167 or to discharge it. When solenoid 171 is energized, the valve 170 connects the cylinder 167 to the discharge conduit 169, thereby lowering the box B. When the solenoid 172 is energized, the valve 170 is moved to position to connect the cylinder 167 with a pressure conduit 168, as illustrated in Fig. 1, thereby to elevate the box or container B.

Operating mechanism for the ram 162 is provided which is adjustable in a number of respects and which is operative to move the ram 162 through two different strokes during alternate operations thereof. That is, the ram will be operated to the position 174 (Fig. 22) during one stroke and to the position 175 during the next stroke. This is for the following reason. It is ofttimes desirable to place two piles of stacked material in a single box side by side. As illustrating in Fig. 22 the boxes B are of the size which receive two such piles. Therefore, for one stroke of the ram 162 a box, such as box 164, will be moved to the position illustrated in Fig. 22. The next movement of the ram 162 will merely move the same box a predetermined amount so that the other half thereof will be filled. As a box B is completely filled it will be pushed from the platform 160 by a new and empty box B and will be conveyed away by a gravity conveyor 176. Due to the fact that for one movement the box B is only to be moved substantially the length of the bodies 39, and in the next movement must be moved an additional distance equal to the length of said bodies 39, plus the thickness of two box side walls, it will be evident that the ram 162 must have alternate strokes of different lengths. If only a single pile of material is put into a single box, then the ram movements will be equal for each movement thereof. To operate the ram 162 I provide a motor 177 (Fig. 3) which drives a pulley 178 (Fig. 4) mounted upon a shaft 179. The shaft 179 carries at its ends a pair of crank discs 180 and 181. The pulley 178 rotates freely upon the shaft 179, but has associated therewith a clutch mechanism 182 of a well known type, which, when operated momentarily by a solenoid 183, will cause the shaft 179 to make a single rotation and then stop. A counter-shaft 184 is mounted upon a frame upon which is also mounted the shaft 179 (not shown) and carries at its ends a pair of ratchet wheels 185, 186. Keyed upon the shaft 184 is a lever 186' provided with an elongated slot 187. The ram 162 is also provided with an elongated slot 188. Said slot 188 is adapted to receive adjustably a fixed pin 189 which has a projecting end extending into said slot 187. It will thus be seen that if the lever 186' is oscillated about the shaft 184 that the ram 162 will be oscillated an amount dependent upon the extent of oscillation of said shaft 184. By adjusting the pin 189 in the elongated slot 188 the normal position of the abutment 163 may be adjusted.

Loosely journaled on the shaft 184 is a pair of crank levers 190 and 191. Said levers 190 and 191 are operable from the crank discs 180 and 181 respectively through connecting rods 192 and 193 respectively. Said levers 190 and 191 are provided with elongated slots, one of which is seen at 194 on lever 190 (see Fig. 19). A pin may be provided for connecting the connecting rod 192 and the lever 190 which may be adjustably fixed in the elongated slot 194, thereby to adjust the stroke of said lever 190. A more important adjustment of the stroke of said lever 190 is provided by virtue of a plurality of apertures in the disc 180, spaced varying distances from the axis of rotation thereof with which a pin 195 pivotally connects the connecting rod 192 to said disc 180. It is thus manifest that the stroke of the crank lever 190 may be adjusted appreciably. Similar mechanism is provided for adjusting the stroke of the lever 191. Carried by the lever 190 is a pawl 196 adapted to engage the ratchet wheel 186 as determined by the operating or non-operating condition of a solenoid 197. A similar pawl 198 cooperates with the ratchet wheel 185 and it is in operating or non-operating condition and dependent upon the condition of solenoid 199.

As will be hereinafter described, the solenoids 197 and 199 are alternately energized for each stroke of the ram 162. As a consequence when a solenoid 197 is energized, lever 190 will be effectively connected to shaft 184 thereby to impart a predetermined stroke to the ram 162 and when solenoid 199 is energized the lever 191 will be effectively connected to shaft 184 to oscillate the ram 162 through a different stroke. As best seen in Fig. 19 of the drawings, the pawl 196 is operative from the solenoid 197 through a link mechanism 200, and a similar link mechanism will connect the armature of solenoid 199 with pawl 198.

To provide for the alternate energization of the solenoids 197 and 199, and the consequent alternation of a long stroke and a short stroke of the ram 162, I provide a distributor drum 201 on the outer end of the lever 190. This drum 201 is provided with notches, of which there may be six, with which cooperates a detent 202. Projecting from the side of the drum 201 are a plurality of pins 203. Stationary adjustable stop means 204 is provided, as indicated in Fig. 19, so that upon each oscillation of the lever 190, the stop 204 will engage one of the pins 203 and rotate the drum 201 one-sixth of a revolution. The drum 201 is provided with a central continuous contact 205 with which cooperates a brush 206 carried upon an insulating pin 207 supported by a bracket 208. Drum 201 also has two sidetracks upon which are elongated electrical contacts 209. There will be three of said contacts 209 on each of said sidetracks spaced 120 degrees apart. The contacts of the two sidetracks are spaced 60 degrees apart in phase relation. A brush 210 rides on one of the sidetracks and a brush 211 upon the other. Brush 210 is connected to solenoid 197 and brush 211 is connected to solenoid 199. The contacts 209 are electrically connected to the central contact 205. Said central contact 205 is connected to a conductor 212 which is connected to a source of power, as will be described hereinafter. It will thus be seen that as the drum 201 rotates the solenoids 197 and 199 will be alternately connected to the conductor 212 with the consequent alternate long and short stroke of the ram 162 as aforesaid.

Referring particularly to Fig. 21 there is illustrated a time delay mechanism for the operation of the gate mechanism E, whereby said gate mechanism will only operate to close the mouth 45 after a number of bodies 39 have been fed to the distributor C following actuation of certain circuits in response to 24 pounds of material in the hopper D in the illustration previously mentioned. As will be hereinafter described, when 24 pounds of material are received in hopper D, a solenoid 213 will be energized which will pull down a wheel or roller 214 onto the belt 35 through a lever 215. The roller 214 is mounted on a pivot 216 and is carried on a pivoted arm 217 pivoted about a stationary pivot 218. A counter-balancing weight 219 is also carried on the arm 217 and is sufficient weight to over-balance the wheel 214, thus tending to maintain it out of contact with the belt 35. The wheel 214 carries a weight 220 and a cam 221. The weight 220 will normally be at the bottom of the wheel 214 in which position the cam 221 will be above the operating arm of a lever 222 pivoted about stationary pivot 223. The lever 223 controls switch 224, which in turn, controls solenoid 56 over conductors 225 and 226.

Carried by the lever 215 is a projection 227 adapted to be engaged by a spring bias latch 228 upon the momentarily energization of the solenoid 213. The latch 228 is pivotally mounted on a plate 53 and has a bottom extension 229 adapted to be engaged by the plate 48 of the gate mechanism E. As a consequence, when solenoid 213 is momentarily energized as aforesaid, roller 214 will be brought into contact with belt 35. At the outset cam 221 will be above the lever 222. The roller 214 will be latched into position by the latch 228 and will continue to rotate, thus causing cam 221 to rock lever 222 and close switch 224. This will energize solenoid 56 over conductors 225 and 226 which are connected directly to power mains 230 and 231 respectively. Gate closing mechanism E will then operate in the manner previously described and when moved to a closed position will release the latch 228 and allow the wheel 214 to lift from the belt 35. Gate mechanism E therefore will remain in a closed position until returned by the solenoid 63 as hereinafter described.

Attention is now directed to Fig. 3 and to the electrical control means for the apparatus which will be described in connection with a typical cycle of operation of one of the distributors C and associated apparatus. It is to be understood that the circuits here disclosed will be duplicated for each of the distributors C and their associated apparatus, unless a contrary indication is given. The driving motor 33 for the conveyor A is energized from power mains 230 and 231 over conductors 232, 233 through a magnetically controlled switch 234. Said switch 234 may be hand operated to closed position and be automatically operable to open position by solenoid 235, which is part of a protective system.

Associated with the entire system are a number of protecting devices which may well now be described. Associated with the belt of conveyor A is a plurality of switches 236, 236 operable from rollers 237, 237, in the event a body 39 becomes caught between a flight 36, and the guide track of the conveyor A, thus elevating the belt. Also associated with the conveyor A is a final chute 238 with which is associated a switch 239. In the normal operation of the device none of the bodies 39 will reach the chute 238, but if due to some abnormal reason such chute should be reached, switch 239 will be closed. The closure of switches 236 or 239 will energize the solenoid 235 over conductors 240, 241. Solenoid 235 will then open switch 234 and stop the motor 33 of the conveyor. In addition, it will close switch 242 to energize a light 243 and ring a bell 244. This will call attention to the disruption of the normal service.

Associated with the hopper D to form a guide for a box B is a pair of side plates 245 having outwardly flared guide bottom portions 246, 246. In the normal operation of the device the guide portions 246, 246 will guide an upwardly moving box B into proper position. However, should a box not be so properly guided, but catch on one side of the guide portion 246, it will contact one of the pivoted plates 247, 247, to close one of the switches 248, 248. Switches 248, 248 are connected in parallel with switches 236 and consequently will operate solenoid 235 as above described, when closed. In addition to the operation of solenoid 235 by any of the switches 236, 239 or 248, soleniod 249 will also be operated over an obvious circuit including conductor 240 and conductor 250, the latter being connected to main 230. When energized, solenoid 249 will break the circuit to the ram operating motor 177 by opening switch 251, thus disabling said motor.

Assuming that the conveyor A is operating in a normal manner and delivering bodies 39 to the first distributor C to the right hand side of Fig. 1, said bodies will be delivered to the four secondary branch chutes 67 in equal numbers, and by said branches delivered to the four individual cells of the weighing hopper D. This operation will continue until a predetermined weight of material is in the hopper D which, for illustration, will be assumed to be 24 pounds. When this event happens, contact point 136 carried by the scale pointer 135 which contact 136 is connected to power main 230 over conductor 252 will make momentary contact with contact point 253. As a consequence power will be supplied to line 254 to which is connected solenoid 255 of relay 256. It may be mentioned that there are a group of relays 256, 257, 258, 259, 260, 261 and 262 which are of essentially the same construction except for such minor differences as are obvious from the drawings, and are of the type in which there are two operating solenoids and two operating armatures, the relays being so constructed that they will remain in any position to which they are moved. In addition, relays 256, 257, 258, 259, and 261 are of the type that when in one position the operating solenoid which moves the relay to said position would have its circuit broken by the armature associated therewith. As soon as the relay is operated in the other direction the circuit to said solenoid will be automatically closed. The other end of the solenoid 255 of relay 256 is connected to the power line 231. As a consequence of the energization of the solenoid 255, contacts 263 of relay 256 will be closed. This results in the breaking of the normally closed circuit to the solenoids 92, 92 normally closed over conductors 264, 265. As a consequence, the projection 69 (Fig. 5) will be locked in the position illustrated in Fig. 5 to stop the random movement of the bodies 39 into the hopper D. At the same time solenoid 266 of relay 257 will be energized from line 254 over a circuit including conductor 267 and the closed contacts 268 of relay 258. The energization of solenoid 266 will close contacts 269 of relay 267 thereby energizing solenoid 270 over conductors 271, 272. Solenoid 270, upon being energized, will rock the lever 107 against the tension of spring 108' thereby causing the cam 99 (Fig. 5) to start the pay-off of the bodies 39 one at a time at predetermined intervals, for example, at three second intervals, until said solenoid 270 is de-energized in response to a weight of 25 pounds in the hopper D in a manner which will be hereinafter described.

The contacting of point 136 with point 253 also energizes the solenoid 213 over conductors 273 and 272 to cause the closing of the gate mechanism E after a predetermined amount of movement of the belt 35, as previously described. This operation insures that there will be a sufficient number of bodies 39 in the distributor C to fill the hopper D to 25 pounds after the gate mechanism E has closed the mouth 45. It is thus evident that the bodies 39 will be fed to the hopper D at a definite rate such as one every three seconds, following the delivery of 24 pounds of material to said hopper. As it is desired to shut off the delivery of material to the hopper D when it contains 25 pounds of material, a contact point 274 is positioned to be contacted by the contact 136 when said 25 pounds has been delivered to said hopper D. When this is done power is delivered over the previously mentioned circuit including the conductor 252, contacts 136 and 274 to line 275. This will result in the energization of the solenoid 276 of relay 257 which will break the contacts 269 and stop the pay-off mechanism by de-energizing the solenoid 270, which, of course, will result in the cam 99 (Fig. 5) returning to its non-operating position. At the same time solenoid 277 of relay 258 will be energized to open the contacts 268. This will prevent the subsequent re-energization of solenoid 266 when the pointer 136 moves downwardly to 24 pounds and contacts point 253 as the material is discharged from the hopper D into the box B. It will of course be obvious that as a pay-off mechanism controlled by the solenoid 270 is no longer energized, that the projection 69 will be locked in the position as illustrated in Fig. 5 and thus no more bodies 39 will be delivered to the hopper D after 25 pounds of material has been delivered thereto.

The energization of the line 275 due to there being 25 pounds of material in hopper D will further energize solenoid 278 of relay 259 and close the contacts 279 thereof. This will energize the solenoid 149 of the hopper D over conductors 280 and 281 with a consequent opening of the bottom plates 138 of said hopper as previously described. As a consequence the cylindrical bodies 39 will roll into the box B and be stacked in even cord-wood fashion.

Energized simultaneously with solenoids 276, 277 and 278 I energize solenoid 281' of relay 260 to open contacts 282 thereof. This opening of contacts 282 breaks the previously closed circuit to solenoid 150 of the hopper D normally closed over conductors 283 and 284, which solenoid 150, as previously described, is operative when energized to close the bottom plates 138 of said hopper D.

Also energized at the same time is solenoid 285 of relay 261 which closes contacts 286 thereof to energize solenoid 171, thereby to open the valve 170 of the hydraulic elevator 161 to allow the box B, which is now receiving the bodies 39, to descend gradually. This action is permitted due to the fact that solenoid 307 of relay 262 is energized simultaneously with solenoid 285, as the two are connected in parallel, thereby opening contacts 303 of relay 262 to break the circuit to solenoid 172. As said box B thus descends, the bodies 39 will be placed therein in cord-wood fashion.

As the box B starts to lower, the switch 155 (see Fig. 6) will pivot about the pivot point 156 under the influence of the biasing spring 287 and a contact point 157 will pivot about a friction pivot 288' so that the point 157 will make an angle with the main body of the switch 155 as illustrated in the dotted line position of Fig. 6. This will be without immediate effect, but when the box B returns to operate the switch 155 the said contact point 157 will momentarily engage contact point 289 when the point 157 is in alignment with the body of switch 155 due to its contacting with the lower pin 158'.

As the elevator 161 lowers the platform 160 to its bottom position, thus lowering the filled box B, it operates a switch 290 which has essentially the same construction as the switch 155 previously described, except, however, that switch 290 has a contact point 291 adapted to make momentary contact with a contact 292 as said platform 160 moves to its lowermost position, but the contact is not made as said platform moves away from said lowermost position. When contacts 291 and 292 engage, power from the line 230 is transferred over conductor 250 to conductor 293 to energize solenoid 183, the side of which is connected to power line 231 over conductor 294. This wil result in the levers 190 and 191 making a single oscillation against the tension of biasing spring 295 as previously described. Furthermore, as was also previously described, one or the other of solenoids 197 and 199 will be energized over conductors 294, 293 and 212, thus the ram 162 will oscillate either to remove the box B from the platform 160 or to move it over if only the first pile of material has been fed thereto. In certain cases only one pile of material will be fed into a single box B. Under these circumstances the connecting rods 192 and 193 will be so adjusted that the ram 162 will have the same stroke regardless of which of the solenoids 197, 199 is energized, and consequently a box B will be completely removed from the platform 160 upon each stroke of the ram 162.

At the same time that contacts 291 and 292 were closed they were effective to energize solenoid 296 of relay 260. As a consequence contacts 282 was thereby closed energizing solenoid 150 and again closing the bottom plates 138, 138 of the hopper D. At the same time that solenoid 296 is energized solenoid 306 of relay 259 is also energized, as these two solenoids are connected in parallel, the latter opening contacts 279, thereby de-energizing solenoid 149 to permit the closing of the bottom of hopper D as aforesaid. Thus the bottom of hopper D is closed automatically after the box B has been lowered therefrom.

Associated with a lever 297 carried by lever 190 is a switch 298, also similar to the switch 155. This switch 298 closes momentarily only after the ram 162 has moved to shift a box B and has returned to its normal non-operating position. When this takes place, power from line 231 is transferred over conductor 250 through the contacts 299, 300 of switch 298 to place power on line 301. Power on line 301 is effective to energize solenoid 302 of relay 262 to close contacts 303 thereof. The closing of contacts 303 will energize solenoid 172 over an obvious circuit to operate the valve 170 to apply pressure to cylinder 167 thereby to elevate the empty box placed on platform 160. It will also energize solenoid 304 of relay 261 which will break the contacts 286 thereof to de-energize solenoid 171, thereby preventing its bucking the action of solenoid 172. At the same time solenoid 305 of relay 258 will be energized to close the contacts 268 thereof, thus preparing the circuit for solenoid 266 when contacts 136 and 253 are closed in response to a new discharge of 24 pounds of material in the hopper D.

It may be mentioned that the reason for opening the contacts 268 to solenoid 266, as previously described, was to prevent the operation of solenoid 270 and the pay-off associated therewith, as the scale 135 moved downwardly from 25 pounds to 24 pounds, thus engaging contacts 136 and 253.

When a new box B reaches the elevated position to receive bodies from the hopper D, it operates the switch 155, previously described, to engage contacts 157 and 289 momentarily. This energizes solenoid 308 of relay 256 over conductors 280 and 309 thereby to close contacts 263 to energize solenoids 92 and again start the random discharge of any bodies in the distributor C in a manner previously described. If the gate mechanism E is closed, this discharge may be somewhat restricted, but as soon as said gate mechanism opens it will continue and the above described cycle of operation will be repeated.

Attention is now directed to the circuits which control the opening of the gate mechanisms of the several distributors as they have been closed. As was previously pointed out, once a gate mechanism moved to closed position it remained there until operated by solenoid 63. Each of the individual distributors C would have a gate mechanism E associated therewith except the last of the series. In the operation of the complete apparatus, the bodies will first be delivered to the right hand distributor C, as viewed in Fig. 1, until the gate mechanism E thereof is closed, as previously described. Thereafter, the bodies will be delivered to the second distributor C until its gate mechanism E is closed. This action will progress until the last distributor is reached. The last distributor has no gate mechanism E, but associated with the scale lever 135' thereof are the usual contacts 253' and 274', which, in the illustration given, represent 24 pounds and 25 pounds respectively. When the contact point 136' of scale 135' engages contact 253' due to the presence of 24 pounds of material in the last hopper D, the control mechanisms associated with the last distributor C will be operated, as previously described, in connection with the first said distributor. However, there is this difference, that there is no solenoid associated with said last distributor C which corresponds to solenoid 213 of the previous distributors. In lieu of such a solenoid and its control circuit, there is connected to contact point 253' a conductor 310, which leads to solenoid 63 which operates the gate mechanism E to its open position. The circuit to said relay is from conductor 252, scale 135', contact points 136' and 253', conductor 310, solenoid 63, conductor 311, to power line 231. It is, of course, evident that conductor 252 is connected to power line 230.

Connected in parallel with solenoid 63 are corresponding solenoids for each of the distributors C, excepting the last one. As illustrated in Fig. 3 of the drawings, the second said distributor C is provided with a solenoid 63' connected in parallel with solenoid 63 over conductors 312 and 313. It will thus be seen that each of the distributors C will be fed successively from the conveyor A and when the last said distributors has been fed 24 pounds of material the gates of all previous distributors will be automatically opened and the cycle will repeat itself. There will be sufficient bodies 39 between the next to the last distributor and said last distributor to fill the hopper D to 25 pounds after the gates of the previous distributors have been opened in response to 24 pounds of material in said last hopper.

Reviewing briefly the operation of the apparatus, cylindrical bodies will be conveyed by the conveyor A successively to a plurality of distributors C. The first of said distributors will receive the bodies and distribute them equally into four different upright chutes by which they will be freely discharged into four different cells of a weighing hopper D until 24 pounds of material is received by said weighing hopper. When this takes place the previous random feeding of said bodies to the hopper D will be terminated and the bodies will be fed to said hopper one at a time at predetermined intervals such as three second intervals, until 25 pounds of material are received by said hopper D. When this happens the bottom of the hopper D will open and the container B will start to lower while the bodies 39 are discharged thereinto in a uniform pile in cord-wood fashion. The box B will be lowered from the hopper D and will be moved away and replaced by another box, if it is so constructed as to receive only a single pile of material.

Should it be constructed to receive two piles of material it will merely be moved over and positioned to receive the second pile. Thereafter the new box, or the same box which has been moved over, will be returned to position to receive another predetermined amount of material. When the 24 pounds of material is received by the hopper D as previously mentioned, gate mechanism E was operated, after a time delay sufficient to insure sufficient bodies in the distributor C to fill the hopper D to 25 pounds, to close the mouth 45 of said first distributor C. The bodies 39 are then fed to the second distributor C where a similar action takes place. This is repeated to and including the last distributor C, after which the cycle repeats itself.

It is thus evident that I have provided a completely automatic system for taking cylindrical bodies from a hopper 38 or from a conveyor A and packaging them in cord-wood fashion in a container or box B with a uniform weight of material in each box. I have also provided a system, which is extremely flexible, in that boxes of different sizes may be filled.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. In an automatic packaging device, the combination with a conveyor constructed and arranged to convey cylindrical bodies, of a distributor constructed and arranged to be fed said bodies by said conveyor and to distribute them to a plurality of chutes, a weighing hopper adapted to receive said bodies from said chutes, a container adapted to receive said bodies from said hopper, and hopper controlled weight operated means constructed and arranged to shut off the feeding of said bodies from said distributor to said hopper when a predetermined weight thereof has been fed thereto, and to discharge said bodies from said hopper to said container in cord-wood fashion.

2. In an automatic packaging device, the combination with a conveyor constructed and arranged to convey cylindrical bodies, of a distributor adapted to be fed said bodies by said conveyor and to distribute them to a plurality of chutes, a weighing hopper adapted to receive said bodies from said chutes and to isolate the bodies received from different chutes, a container adapted to receive said bodies from said hopper, a gate for controlling the feeding of said bodies from said conveyor to said distributor, control means operated by said hopper as determined by the weight of material therein, said distributor and said control means being so constructed and arranged that said bodies will be fed to said chutes in equal numbers and fed freely from said chutes into said hopper until a predetermined weight is received by said hopper which is slightly below the amount desired to fill said container, after which said bodies will be fed to said hopper at a predetermined controlled rate until the desired amount is received thereby, after which said hopper will automatically discharge said bodies into said container in cord-wood fashion, said gate being closed by said control means in response to said predetermined weight in said hopper.

3. In an automatic packing device, the combination with a conveyor constructed and arranged to convey bodies of similar size and shape, of a distributor constructed and arranged to be fed said bodies by said conveyor and to distribute them equally into a plurality of compartments, weighing means adapted to weigh the distributed bodies, a container adapted to receive said bodies in a uniform fashion, means operated by said weighing means and constructed and arranged to shut off the feeding of said bodies when a predetermined weight thereof has been distributed, and means constructed and arranged to place said weighed quantity of bodies uniformly in said container.

4. In an automatic packing device, the combination with a conveyor constructed and arranged to convey bodies of similar size and shape, of a distributor constructed and arranged to be fed said bodies by said conveyor and to distribute them equally into a plurality of compartments, weighing means adapted to weigh the distributed bodies, a container adapted to receive said bodies in a uniform fashion, means operated by said weighing means and constructed and arranged to reduce the rate of feed of said bodies when a predetermined weight thereof is approached and to feed them singly thereafter until said predetermined weight is reached and distributed.

5. In an automatic packaging device, the combination with a conveyor constructed and arranged to convey uniformly shaped bodies, of a distributor adapted to be fed said bodies by said conveyor and to distribute them to a plurality of chutes, a weighing hopper adapted to receive said bodies from said chutes and to isolate the bodies received from different chutes, a container adapted to receive said bodies from said hopper, control means for said conveyor operated by said hopper as determined by the weight of said bodies therein, said distributor and said control means being so constructed and arranged that said bodies will be fed to said chutes in equal numbers and fed freely from said chutes into said hopper until a predetermined weight thereof is received by said hopper which is slightly below the amount desired in said container, after which said bodies will be fed to said hopper at a predetermined controlled weight until the desired amount is received thereby, after which said hopper will automatically discharge said bodies into said container in a uniform fashion.

6. In an automatic packaging device, the combination with a conveyor constructed and arranged to convey uniformly shaped bodies, of a distributor adapted to be fed said bodies by said conveyor and to distribute them to a plurality of chutes, a weighing hopper adapted to receive said bodies from said chutes and to isolate the bodies received from different chutes, a container adapted to receive said bodies from said hopper, control means for said conveyor operated by said hopper as determined by the weight of said bodies therein, said distributor and said control means being so constructed and arranged that said bodies will be fed to said chutes in equal numbers and until a predetermined weight is received by said hopper, after which said hopper will automatically discharge said bodies into said container in a uniform fashion.

EDWARD U. CAVE.